United States Patent [19]

Wellborn, Jr.

[11] 4,181,320

[45] Jan. 1, 1980

[54] TRAILER HITCH PROTECTOR

[76] Inventor: Walter H. Wellborn, Jr., 150 Devon Dr., Clearwater Beach, Fla. 33515

[21] Appl. No.: 794,536

[22] Filed: May 6, 1977

[51] Int. Cl.² ............................................. B60D 1/06
[52] U.S. Cl. .................................... 280/507; 280/511
[58] Field of Search ................. 280/507, 511; 403/12, 403/130

[56] References Cited

U.S. PATENT DOCUMENTS

| | | | |
|---|---|---|---|
| D. 61,531 | 10/1922 | Fulper | D9/259 |
| D. 147,337 | 8/1947 | Koeningsberger | D9/259 |
| D. 163,888 | 7/1951 | Merillat | D9/259 |
| 2,714,912 | 8/1955 | Gonnella | 280/507 UX |
| 3,228,445 | 1/1966 | Mayotte | 280/507 X |
| 3,679,234 | 7/1972 | Colliau | 403/130 X |

*Primary Examiner*—Joseph F. Peters, Jr.
*Assistant Examiner*—Norman L. Stack, Jr.
*Attorney, Agent, or Firm*—Stein & Frijouf

[57] ABSTRACT

The invention is a protector for a trailer hitch assembly having a trailer hitch ball supported on a trailer hitch neck. The protector includes an integral covering member having an outer covering member surface and an inner covering member surface. The inner covering member surface defines an internal region capable of receiving the trailer hitch ball. An aperture in the covering member is defined by a plurality of resilient covering member fingers to receive the trailer hitch ball within the internal region of the integral covering member. The covering member fingers resiliently engage the trailer hitch neck to position the covering member relative to the trailer hitch assembly. The outer covering member surface may be established in the shape of a commercial product, such as an oil container, an outboard motor power head or the like. Written or color indicia may be included on the outer covering member surface distinctive of a trademark of the commercial product.

7 Claims, 7 Drawing Figures

TRAILER HITCH PROTECTOR

BACKGROUND OF THE INVENTION

1. Field of the Invention

This invention relates to protective devices and more particularly to trailer hitch ball protectors.

2. Description of the Prior Art

Various types of devices have been used for protecting a trailer hitch assembly and more particularly a trailer hitch ball which is supported on a trailer hitch neck from a trailer hitch frame. Generally, the trailer hitch frame is attached to the bumper or the frame of an automobile or truck with the trailer hitch ball permanently mounted and extending outwardly from the rear of the vehicle. Since the surface of the ball is only intermittently used, the possibility of corrosion or damage to the outer surface of the ball is ever present during the periods of non-use. In many cases, the ball-joint action of the trailer hitch ball with the trailer tongue receiving the ball is impaired due to corrosion and damage to the trailer hitch ball.

Some in the prior art have provided protecting devices made of metal, rubber and the like for insertion on the trailer hitch ball to protect the outer surface thereof. These protecting devices were generally relatively expensive and were purchased by the consumer through a trailer or hitch supply dealer.

Accordingly, there is a need in the art for a trailer hitch protector which may be economically manufactured and adapted for use on various sizes of trailer hitch balls. It would also be desirable to use a trailer hitch protector as an advertising or premium item for a commercial product or service.

Therefore it is an object of this invention to provide an apparatus which overcomes the aforementioned inadequacies of the prior art devices and provides an improvement which is a significant contribution to the advancement of the trailer hitch art.

Another object of this invention is to provide a protector for a trailer hitch ball comprising an integral covering member having an outer covering member surface and aperture means in the covering member for receiving the trailer hitch ball within the covering member with covering member fingers resiliently engaging a trailer hitch neck which supports the trailer hitch ball.

Another object of this invention is to provide a protector for a trailer hitch ball wherein the integral covering member is a relatively thin structure which may be molded, formed or cast from a plastic, rubber or metallic material as an integral structure.

Another object of this invention is to provide a protector for a trailer hitch ball wherein the outer covering member surface is established to be in a shape of a commercial product such as a motor oil container, an outboard motor power head, a liquid bottle container or the like.

Another object of this invention is to provide a protector for a trailer hitch ball including printed, written or color symbolic indicia on the outer covering member surface such as a trademark or a color identifying the origin of the commercial product.

Another object of this invention is to provide a protector for a trailer hitch ball which may be economically manufactured and used as an advertising premium item for products.

Other objects and a fuller understanding of this invention may be had by referring to the summary of the invention, the description and the claims, taken in conjunction with the accompanying drawings.

SUMMARY OF THE INVENTION

The invention may be incorporated into a protector for a trailer hitch assembly having a trailer hitch ball supported on a trailer hitch neck. The protector includes an integral covering member having an outer covering member surface and an inner covering member surface. The inner covering member surface defines an internal region in the covering member capable of receiving the trailer hitch ball. Aperture means in the covering member is defined by a plurality of resilient covering member fingers for enabling the trailer hitch ball to be received within the internal region of the integral covering member with the covering member fingers resiliently engaging the trailer hitch neck.

The integral covering member may be a relatively thin integral structure with the contour of the inner covering member surface being substantially similar to the contour of the outer covering member surface. The integral covering member may be a substantially rigid material with the resilient covering member fingers defined by a plurality of slots in the integral covering member. In one of the embodiments, each of the plurality of slots has a width substantially less than the width of each of the resilient covering member fingers. In another embodiment, each of the plurality of slots has a width commensurate with the width of each of the resilient covering member fingers.

The aperture means may be established to be slightly smaller than the trailer hitch neck enabling the terminal ends of the resilient covering member fingers to resiliently engage the trailer hitch neck. In the alternative, the aperture means may be substantially smaller than the trailer hitch neck enabling a lateral surface of each of the resilient covering member fingers to resiliently engage the trailer hitch neck with the terminal ends of each of the resilient covering member fingers resiliently engaging the trailer hitch ball.

The outer covering member surface may be established in a shape of a commercial product. The commercial product may include the shape of the container of the commercial product, such as a motor oil container, an outboard motor power head, a liquid bottle container, or the like. In the alternative, the shape may be the shape of the product itself; for example, an orange or other fruit, vegetable or the like. The invention may include symbolic indicia on the outer covering member surface for identifying the origin of the commercial product. The identifying indicia may include written or printed informative material in addition to colors or the trademark of the commercial product.

This invention accordingly comprises an article possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
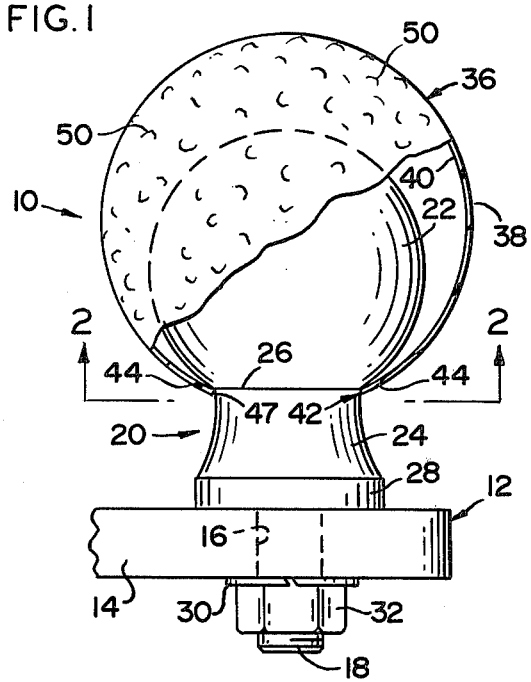
FIG. 1 is a side elevational view, partially in section, of a protector for a trailer hitch assembly resiliently mounted on a trailer hitch neck for protecting a trailer hitch ball.

FIG. 1 is a side elevation view, partially in section, of a protector device 10 for a trailer hitch assembly 12 comprising a trailer hitch frame 14 secured to a vehicle, such as a car or a truck (not shown). The hitch frame 14 includes a through aperture 16 for receiving a fitted stud 18 of the trailer ball assembly generally indicated as 20. The trailer ball assembly 20 includes a substantially spherical trailer hitch ball 22 supported on a trailer hitch neck 24. The neck 24 curves outwardly from the base 26 of the hitch ball 22 to a bottom flange 28 of the hitch neck 24. The stud 18 may be integral with the hitch ball 22 and/or the hitch neck 24 and is secured to the hitch frame 14 by a locking washer 30 and a nut 32.

The protector 10 comprises an integral covering member 36 having an outer covering member surface 38 and an inner covering member surface 40. The inner covering member surface 40 defines the internal region of the covering member 36 which is capable of receiving the trailer hitch ball 22. In this embodiment, the integral covering member 36 is illustrated as a relatively thin structure made of an integral plastic material with the contour of the inner covering member surface 40 being substantially similar to the contour of the outer covering member surface 38. The plastic material is substantially rigid and may be injection molded, vacuum formed or the like. It should be understood that the protector 10 may also be constructed of a metallic or rubber material.

Figure 2:
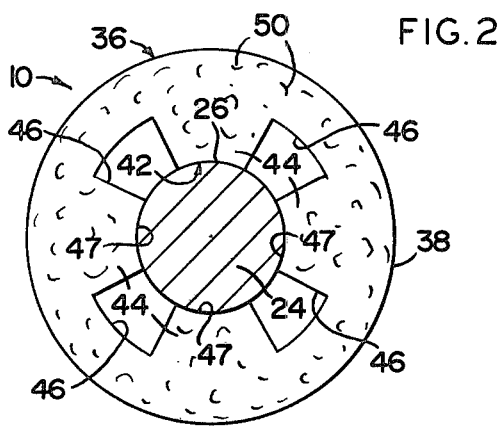
FIG. 2 is a sectional view along line 2—2 of the protector shown in FIG. 1.

Aperture means 42 shown in greater detail in FIG. 2, is defined by a plurality of resilient covering member fingers 44 shown as four fingers substantially equally arranged about the circumference of the hitch neck 24. The plurality of covering member fingers 44 are defined by a plurality of slots 46 in the integral covering member 36, which slots 46 have a width substantially commensurate with the width of each of the resilient covering member fingers 44. The aperture means 42 is slightly smaller than the diameter of the trailer hitch neck 24 at the base 26 of the trailer hitch ball 22. The resilient covering member fingers 44 enables the trailer hitch ball 22 to be received within the internal region of the covering member 36 as shown in FIGS. 1 and 2, with the terminal ends 47 of the covering member fingers 44 resiliently engaging the trailer hitch neck 24 at the base 26 of the trailer hitch ball 22.

Figure 3:
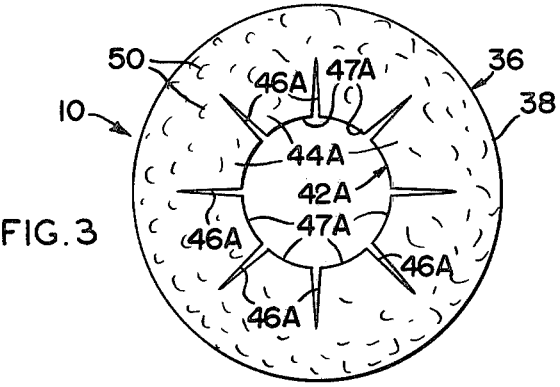
FIG. 3 is a modification of the invention shown in FIG. 2.

FIG. 3 illustrates aperture means 42A which is a variation of the aperture means 42 shown in FIG. 2. In this embodiment, the covering member fingers 44A are shown as eight fingers equally distributed about the aperture means 42A and defined by slots 46A in the integral covering member 36. Each of the slots 46A has a width substantially less than the width of each of the resilient covering member fingers 44A. In this embodiment, the diameter of aperture means 42A is slightly smaller than the diameter of the trailer hitch neck 24 at the base 26 of the trailer hitch ball 22. Aperture means 42A operates in a manner similar to aperture means 42.

Figure 4:
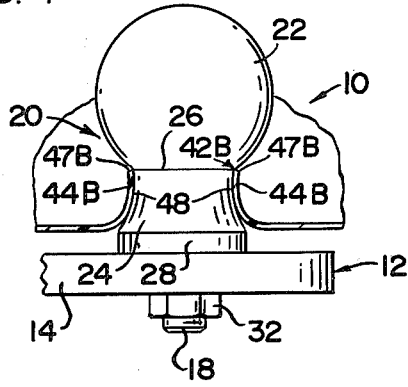
FIG. 4 is a partial side sectional view of a modification of the invention shown in FIGS. 1–3.

FIG. 4 illustrates aperture means 42B which is still another variation of the aperture means 42 and 42A shown in FIGS. 1–3. In this embodiment, the aperture means 42B is substantially smaller than the trailer hitch neck 24 at the base 26 of the trailer hitch ball 22. Lateral surfaces 48 of resilient covering member fingers 44B resiliently engage the trailer hitch neck 24 with the terminal ends 47B of each of the resilient covering member fingers 44B resiliently engaging the trailer hitch ball 22 at the base 26. It should be understood that either of the slots 46 and 46A shown in FIGS. 2 and 3, may be incorporated into the embodiment shown in FIG. 4. The resilient covering member fingers 44B secure the protective device 10 relative to the hitch ball 22.

An important aspect of the instant invention resides in the shape of the outer member covering surface 38. FIGS. 1–3 illustrate the outer member covering member surface being in the shape of a commercial product and more particularly in the shape of an orange. The outer covering member surface includes indentations 50 giving the outer surface 38 the appearance and texture of an orange. It should be understood that the outer covering surface 38 may be colored in an orange color representative of a citrus orange product of a citrus producer.

Figure 5:
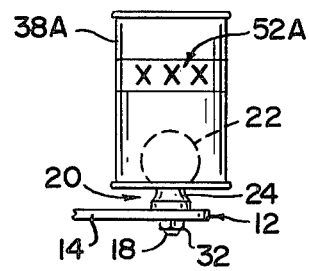
FIG. 5 is a side elevational view of a modification of the protector device shown in FIGS. 1–4 wherein the outer covering member surface is established in the shape of a motor oil container.
Figure 6:
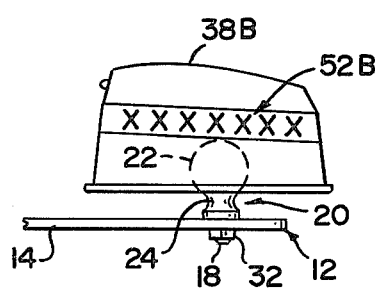
FIG. 6 is a side elevational view of a modification of the protector device shown in FIGS. 1–4 wherein the outer covering member surface is established in the shape of an outboard motor power head.
Figure 7:
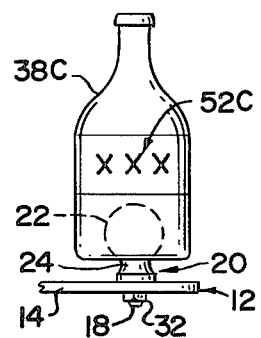
FIG. 7 is a side elevational view of a modification of the protector device shown in FIGS. 1–4 wherein the outer covering member surface is established in the shape of a liquid bottle container.

FIGS. 5–7 illustrate the outer covering member surface being in the shape of a container of a commercial product. In FIG. 5, the outer covering member surface 38A is established in the shape of a motor oil container. The color or striping of the outer surface 38A may be indicative of a particular refiner of motor oil with indicia 52A identifying the trademark of the motor oil refiner or retailer.

FIG. 6 illustrates another variation of the outer covering member surface 38B which is formed in the shape of an outboard motor power head. Similar color patterns may be incorporated of the particular manufacturer of outboard motors. Trademark indicia 52B may also be incorporated identifying a specific manufacturer of outboard motors.

FIG. 7 represents still another embodiment of the invention wherein the outer covering member surface 38C is established in the shape of a liquid bottle container. Indicia 52C may be indicative of the trademark of the product of the contents of the liquid bottle container. Similar color patterns may be included therewith. It should be understood that the shape shown in FIG. 7 is a general shape, and that a particular and distinctive container shape for a distinctive liquid product, such as a soft drink bottle, is contemplated within the instant invention.

The invention heretofore described provides a simple and inexpensive protector for a trailer hitch ball which may also be economically manufactured as a premium item for advertising of products.

The present disclosure includes that container in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described, What is claimed is:

1. A protector for a trailer hitch assembly having a trailer hitch ball supported on a trailer hitch neck, comprising in combination:

an integral rigid member having an outer covering member surface and an inner covering member surface;

said inner covering member surface defining an internal region in said covering member capable of receiving the trailer hitch ball;

said integral covering member being a relatively thin structure with the contour of said inner covering member surface being substantially similar to the contour of said outer covering member surface;

aperture means in said covering member defined by a plurality of resilient covering member fingers for enabling the trailer hitch ball to be received within said internal region of said integral covering member with said covering members fingers resiliently engaging the trailer hitch neck;

said resilient covering member finger being defined by a plurality of slots in said integral covering member; and said aperture means being substantially smaller than the trailer hitch neck enabling said covering member fingers to be folded inwardly with the outside surface of each of said covering member finger resiliently engaging the trailer hitch neck and with the terminal ends of each of said resilient covering member fingers to resiliently engage the base of the trailer hitch ball.

2. A protector for a trailer hitch assembly having a trailer hitch ball supported by a trailer hitch neck, comprising in combination:

an internal rigid covering member having an outer covering member surface and an inner covering member surface;

said inner covering member surface defining an internal region in said covering member capable of receiving the trailer hitch ball;

said integral covering member being a relatively thin structure with the contour of said inner covering member surface being substantially similar to the contour of said outer covering member surface;

aperture means in said covering member for enabling the trailer hitch ball to be received within said internal region of said integral covering member and for engaging the trailer hitch neck; and each of said plurality of slots having a width substantially equal to the width of each of said resilient covering member fingers forming a passageway adjacent each of said covering member fingers;

said aperture means being slightly smaller than the trailer hitch neck enabling the terminal ends of said resilient covering member finger to resiliently engage the trailer hitch neck; and means establishing the outer covering member surface to be in the shape of a commercial product.

3. A protector as set forth in claim 2, wherein said shape of the commercial product includes the shape of the container of the commercial product.

4. A protector as set forth in claim 2, wherein said shape of the commercial product includes the shape of a motor oil container.

5. A protector as set forth in claim 2, wherein said shape of the commercial product includes the shape of an outboard motor power head.

6. A protector as set forth in claim 2, wherein said shape of the commercial product includes the shape of a liquid bottle container.

7. A protector as set forth in claim 2, wherein said shape of the commercial product includes the shape of an orange.

* * * * *